(12) United States Patent
Ruan et al.

(10) Patent No.: US 12,712,730 B2
(45) Date of Patent: Aug. 18, 2026

(54) SYSTEM AND METHOD FOR ARCHITECTURAL INTEGRITY ASSURANCE IN NEURAL NETWORKS

(71) Applicants: Yuxin Ruan, New York, NY (US); Michael D. Doyle, Wheaton, IL (US); Paul F. Doyle, Grand Rapids, MI (US)

(72) Inventors: Yuxin Ruan, New York, NY (US); Michael D. Doyle, Wheaton, IL (US); Paul F. Doyle, Grand Rapids, MI (US)

( * ) Notice: Subject to any disclaimer, the term of this patent is extended or adjusted under 35 U.S.C. 154(b) by 25 days.

(21) Appl. No.: 18/893,496

(22) Filed: Sep. 23, 2024

(65) Prior Publication Data

US 2025/0106021 A1 Mar. 27, 2025

Related U.S. Application Data

(60) Provisional application No. 63/584,888, filed on Sep. 24, 2023.

(51) Int. Cl.

*H04L 29/06* (2006.01)
*H04L 9/14* (2006.01)
*H04L 9/32* (2006.01)

(52) U.S. Cl.

CPC .............. *H04L 9/14* (2013.01); *H04L 9/3242* (2013.01)

(58) Field of Classification Search

None

See application file for complete search history.

(56) References Cited

U.S. PATENT DOCUMENTS

| | | | | |
|---|---|---|---|---|
| 11,055,384 B1 * | 7/2021 | Crawforth | ............. | H04L 9/0637 |
| 2020/0159966 A1 * | 5/2020 | Sibert | .................. | H04L 9/3271 |
| 2020/0169425 A1 * | 5/2020 | Hofstee | ................. | H04L 9/0861 |
| 2021/0149733 A1 * | 5/2021 | Cheng | .................... | G06N 20/00 |
| 2021/0326442 A1 * | 10/2021 | Campagna | ............. | G06F 21/57 |
| 2024/0070266 A1 * | 2/2024 | Chai | ...................... | G06F 21/14 |

* cited by examiner

*Primary Examiner* — Maung T Lwin

(74) *Attorney, Agent, or Firm* — Klintworth & Rozenblat LLP

(57) ABSTRACT

The present invention provides a computer system and method for ensuring the architectural integrity and authenticity of neural networks using cryptographic techniques and timestamping mechanisms. The system certifies and validates the internal state of tensor and graph data structures within neural networks by computing hash values of the network's tensors and graphs and associating these values with specific time intervals. This can be achieved through use of transient-key cryptography, wherein a time-specific cryptographic key pair is generated for each interval, allowing the signing of hash values and ensuring data integrity. A timestamping authority issues timestamp tokens for the hash values, which are stored in a distributed, redundant archive for future verification. The validation process involves comparing the current state of the neural network with the stored hash values, ensuring any tampering or unauthorized modifications can be detected. This approach enhances the security and trustworthiness of neural network models across critical applications by safeguarding against adversarial attacks and model poisoning.

7 Claims, 1 Drawing Sheet

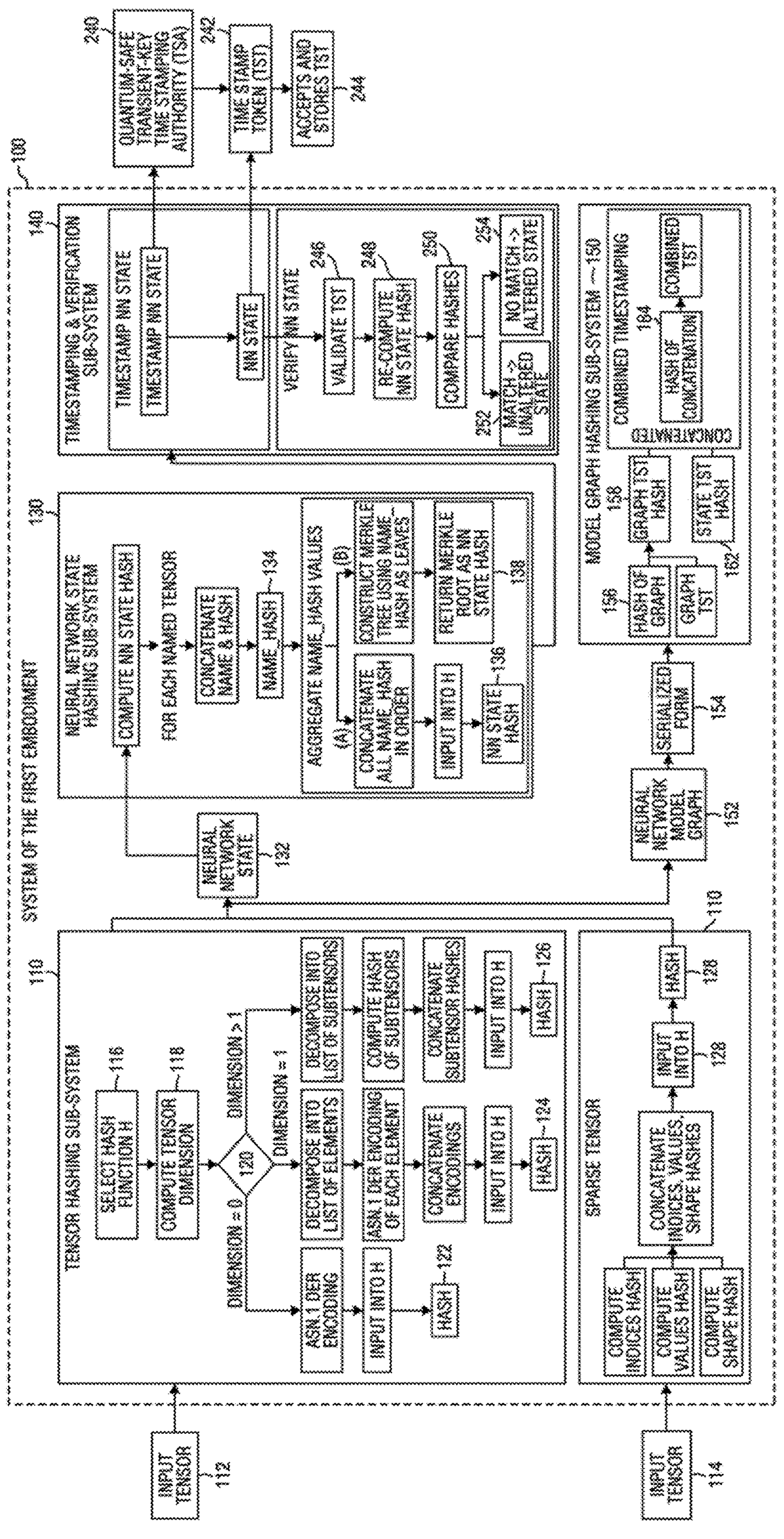
SYSTEM OF THE FIRST EMBODIMENT
100
INPUT TENSOR
112
INPUT TENSOR
114
TENSOR HASHING SUB-SYSTEM
110
SELECT HASH FUNCTION H
116
COMPUTE TENSOR DIMENSION
118
120
DIMENSION = 0
DIMENSION = 1
DIMENSION > 1
ASN.1 DER ENCODING
INPUT INTO H
HASH
122
DECOMPOSE INTO LIST OF ELEMENTS
ASN.1 DER ENCODING OF EACH ELEMENT
CONCATENATE ENCODINGS
INPUT INTO H
HASH
124
DECOMPOSE INTO LIST OF SUBTENSORS
COMPUTE HASH OF SUBTENSORS
CONCATENATE SUBTENSOR HASHES
INPUT INTO H
HASH
126
SPARSE TENSOR
110
COMPUTE INDICES HASH
COMPUTE VALUES HASH
COMPUTE SHAPE HASH
CONCATENATE INDICES, VALUES, SHAPE HASHES
INPUT INTO H
128
HASH
128
NEURAL NETWORK STATE
132
NEURAL NETWORK STATE HASHING SUB-SYSTEM
130
COMPUTE NN STATE HASH
FOR EACH NAMED TENSOR
CONCATENATE NAME & HASH
NAME_HASH
134
AGGREGATE NAME_HASH VALUES
(A)
(B)
CONCATENATE ALL NAME_HASH IN ORDER
INPUT INTO H
NN STATE HASH
136
CONSTRUCT MERKLE TREE USING NAME_HASH AS LEAVES
RETURN MERKLE ROOT AS NN STATE HASH
138
NEURAL NETWORK MODEL GRAPH
152
SERIALIZED FORM
154
MODEL GRAPH HASHING SUB-SYSTEM
150
HASH OF GRAPH
156
GRAPH TST
GRAPH TST HASH
158
STATE TST HASH
162
CONCATENATED
COMBINED TIMESTAMPING
HASH OF CONCATENATION
164
COMBINED TST
TIMESTAMPING & VERIFICATION SUB-SYSTEM
140
TIMESTAMP NN STATE
TIMESTAMP NN STATE
NN STATE
VERIFY NN STATE
VALIDATE TST
246
RE-COMPUTE NN STATE HASH
248
COMPARE HASHES
250
MATCH -> UNALTERED STATE
252
NO MATCH -> ALTERED STATE
254
QUANTUM-SAFE TRANSIENT-KEY TIME STAMPING AUTHORITY (TSA)
240
TIME STAMP TOKEN (TST)
242
ACCEPTS AND STORES TST
244

SYSTEM AND METHOD FOR ARCHITECTURAL INTEGRITY ASSURANCE IN NEURAL NETWORKS

CROSS-REFERENCE TO RELATED APPLICATIONS provisional application 63/584,888, filed on Sep. 24, 2023

BACKGROUND

The present invention relates to the field of computer-based artificial intelligence, specifically to methods and computer systems designed to ensure the architectural integrity and authenticity of neural network models. This invention employs advanced cryptographic techniques to protect the internal data structures, such as tensors, used within neural networks, thereby enhancing their security against adversarial attacks and tampering.

Neural networks, pivotal in the rapidly evolving landscape of artificial intelligence, have revolutionized our approach to data-driven challenges across various domains. Their adeptness at deciphering intricate correlations within expansive datasets has enabled the development of robust models tailored for a wide range of applications, including many with extreme security requirements. Yet, for all their prowess, neural networks are not without their Achilles' heels. They remain susceptible to adversarial attacks: intentionally-malformed inputs that can mislead these models into making flawed conclusions, despite appearing benign. This topic has garnered widespread attention in recent years, prompting attempted solutions by researchers across diverse application sectors. While current approaches begin to address some vulnerabilities, there is an urgent need to assure the integrity of neural net architectures amidst an environment of continually emerging threats.

Securing Neural Networks: Approaches and Challenges

Neural networks, often hailed as the bedrock of modern artificial intelligence, play an instrumental role in an array of applications, ranging from healthcare diagnostics to financial forecasting. Yet, like many technological advances, they come with their own sets of vulnerabilities. As these networks grow in prominence, so too does the imperative to secure them from a plethora of threats.

Existing approaches to neural net security typically fall into a handful of categories:

1. Adversarial Training: One of the most prevalent methods for fortifying neural networks against adversarial attacks is adversarial training. By incorporating adversarial examples into the training set and iteratively refining the model, this method essentially 'inoculates' the network, making it more robust against adversarial perturbations.
2. Regularization Techniques: These are aimed at constraining the model's parameters during training, thereby potentially reducing overfitting and enhancing the model's generalization against adversarial inputs.
3. Feature Squeezing: This method reduces the search space available to an adversary by squeezing input data into a simpler format, making it harder to craft adversarial examples that can deceive the model.
4. Defensive Distillation: Here, a network is trained to produce soft outputs (i.e., probability distributions over classes) instead of hard decisions. This softening process can obscure gradients, making it challenging for adversaries to generate potent adversarial examples.

5. Input Preprocessing: Techniques such as image denoising or transformations are applied to input data before it is fed into the neural network, potentially neutralizing adversarial perturbations.

These approaches focus on defensive strategies against data poisoning, malformed training data intended to lead to a trained model that produces incorrect or misdirected results. They don't address malicious attacks against the models themselves. The dominant approach to protect against model attacks in recent years has taken the form of model watermarking.

Model Watermarking

As the threats against neural networks grow in sophistication, so too do the defense mechanisms. Model watermarking has recently been spotlighted as a promising avenue in the industry's toolkit against model theft and poisoning. By embedding a unique signature or watermark into the model during training, it becomes possible to verify the model's authenticity and provenance. (Described in Adi, Y., Baum, C., Cisse, M., Pinkas, B., & Keshet, J. Turning Your Weakness Into a Strength: Watermarking Deep Neural Networks by Backdooring. USENIX Security Symposium, 2018; Zhang, J., Zhu, Z., Zhang, Z., Liu, Y., & Zhang, X. Protecting Intellectual Property of Deep Neural Networks with Watermarking. ACM Asia Conference on Computer and Communications Security, 2018; Rouhani, B. D., Chen, H., & Koushanfar, F. Deepsigns: A Generic Watermarking Framework for IP Protection of Deep Learning Models. arXiv preprint arXiv: 1804.00750, 2018; Le Merrer, E. R., Perez, P., & Troncoso-Pastoriza, J. R. Adversarial watermarking of deep neural networks. Venue: International Conference on Computer Security, 2019; Uchida, Y., Nagai, Y., Sakazawa, S., & Satoh, S. Embedding Watermarks into Deep Neural Networks. ACM Workshop on Information Hiding and Multimedia Security, 2017; Fan, L., Ng, K. W., & Sankaranarayanan, S. A Robustness Analysis of Watermarking Deep Neural Networks. arXiv preprint arXiv: 1906.07745, 2019; and incorporated herein by reference.)

The watermark, often imperceptible during regular operations, can be triggered under specific conditions, revealing the model's original creator or owner. This serves a dual purpose:

1. Deterring Model Theft: By having a verifiable watermark, unauthorized usage or replication of a model can be identified and potentially litigated.
2. Mitigating Poisoning Risks: A watermark can act as a reference point or a baseline. Any significant deviation from this baseline during the model's operation can be an indicator of potential tampering or poisoning.

Model watermarking refers to the process of embedding a unique signature or "watermark" into a machine learning model. The primary goal of model watermarking is to establish ownership or origin verification of a trained model. This is particularly useful in contexts where models might be shared, sold, or otherwise distributed, and there's a risk of unauthorized copying or use.

Motivations for Model Watermarking

1. Proof of Ownership: In cases of disputes over model ownership, a watermark can serve as proof that a particular party developed and owns the model.
2. Piracy and Theft Detection: Watermarks can be used to detect unauthorized copies or distributions of a model.
3. Tamper Detection: If a watermark gets altered or becomes unreadable, it can indicate that the model might have been tampered with.

Types of Model Watermarking

1. Passive Watermarking:

In this approach, a watermark is embedded into the model, but there's no active mechanism to verify its presence. Instead, the owner would need to recognize or extract the watermark if there's a need to prove ownership.

2. Active Watermarking:

This method involves embedding a watermark such that it can be actively verified. For instance, by feeding a specific input to the model, the output might reveal the presence of the watermark.

Watermarking Techniques

1. Embedded Patterns: One way to watermark a model is by training it with unique patterns or data that wouldn't naturally appear in the training set. Later, the presence of the watermark can be verified by observing the model's output when presented with the unique pattern.
2. Parameter Alterations: Directly modify certain model parameters or weights to embed a watermark. The idea is to make changes that don't drastically affect the model's performance but are sufficient to encode a recognizable signature.
3. Architectural Changes: Introduce subtle, unique changes to the model's architecture as a watermark. This could be specific neuron connections or unique layer configurations.

Challenges with Model Watermarking:

1. Robustness: The watermark should be robust against various post-processing operations, such as model fine-tuning, pruning, or quantization.
2. Imperceptibility: The watermark should not noticeably degrade the model's performance or predictability.
3. Security: It should be difficult for attackers to remove or alter the watermark without significant degradation to the model's performance.
4. Uniqueness: Watermarks should be distinct and hard to replicate, ensuring clear proof of ownership.
5. Overhead: Introducing watermarks typically leads to substantial computational or storage overheads.

It's worth noting that while model watermarking provides a mechanism to assert ownership and detect unauthorized use, it's not a foolproof solution. Determined attackers might still find ways to remove or alter watermarks, especially if they have a good understanding of the watermarking technique used. As with many security measures, model watermarking is one tool in a larger toolkit of techniques to protect intellectual property in the realm of machine learning.

Watermarking, in its traditional sense of embedding a persistent and detectable signal within a static medium (like images or audio), can present challenges when applied to dynamic models like neural networks, especially when we consider the intricacies of their learning processes and internal representations.

Here are some reasons why watermarking may face challenges in detecting tampering with the internal structure of a model:

1. Model Fine-Tuning: Post-training adjustments, or fine-tuning, can alter the internal representations of a neural network. This could inadvertently distort or erase a watermark even if no malicious tampering has occurred.
2. Model Pruning and Quantization: For efficiency, neural networks are often pruned (wherein less important neurons/connections are removed) or quantized (wherein weights are represented with lower precision). These processes can significantly modify the internal structure of a model, potentially affecting any embedded watermark.
3. Non-persistence of Embedded Watermarks: Given that neural networks adjust their weights during training, an embedded watermark might not persist throughout the entirety of the training process, especially if it doesn't align with the primary learning objective.
4. Detecting Subtle Tampering: If an adversary has knowledge about the watermarking scheme and conducts a subtle tampering attack that only slightly modifies the internal weights while preserving most of the functionality, the watermark might remain intact, making detection challenging.

However, while these challenges exist, the concept of watermarking in neural networks often moves beyond the traditional idea of merely embedding a persistent signal. Instead, it focuses on ensuring certain behaviors or responses under specific conditions, providing a means of verification. For instance, a watermarked model might be designed to produce a specific output when given a particular input, serving as proof of ownership or originality.

It's crucial to differentiate between watermarking for proving model ownership (or origin) and watermarking (or any method) for detecting model poisoning, tampering with the internal structure of a neural network. While the former has seen more success and adoption, the latter remains a challenging area of research.

Model Poisoning: An Emerging Threat

Beyond adversarial attacks, model poisoning represents a disconcerting vulnerability in neural network security. Here, attackers don't just perturb inputs but introduce malicious data during the model's training phase. This corrupted data can cause the model to make incorrect predictions, or worse, behave in ways that adversaries can exploit in later stages. The insidious nature of model poisoning arises from its stealth: unlike adversarial attacks which focus on instant manipulations, poisoning slowly taints the model's learning process itself.

Defenses Against Model Poisoning

1. Data Sanitization: Regularly auditing and cleaning the training data to remove any suspicious or outlier instances can help in mitigating poisoning attacks.
2. Regularization: Similar to defending against adversarial attacks, regularization can also aid in countering model poisoning by discouraging the model from fitting too closely to poisoned data.
3. Robust Optimization: Training models with the aim of minimizing the impact of worst-case perturbations can offer resilience against poisoning attacks.
4. Anomaly Detection: By monitoring the model's training process and its evolving decision boundaries, one can detect and counteract sudden shifts indicative of poisoning.

These approaches address the issue by either attempting to inoculate the networks to make them more resilient against attack, or by actively monitoring the dynamic output of operating networks to detect anomalous behavior. A much more direct approach would be to employ a system that can prove the data integrity of the internal data structures that neural networks use to represent their trained state, the tensors.

Tensors

Neural networks, especially those used in deep learning, make extensive use of tensors, which are multi-dimensional arrays of numbers. In the context of neural nets and machine learning, tensors offer a highly flexible and efficient way to represent and compute data. Here's how tensors are used:

1. Data Representation: In deep learning, our data is often multi-dimensional. For example:
   a. A grayscale image can be represented as a 2D tensor (height×width).
   b. A color image, with three color channels (RGB), can be represented as a 3D tensor (height×width×3).
   c. A batch of color images can be represented as a 4D tensor (batch size×height×width×3).
2. Weights and Biases: The parameters of the neural network, such as weights and biases, are also stored as tensors. The dimensionality of these tensors depends on the architecture and layer type. For instance, the weights of a fully connected layer can be stored in a 2D tensor, while the weights of a convolutional layer might be in a 4D tensor.
3. Operations: Neural networks involve a series of mathematical operations like matrix multiplications, additions, and activations. These operations are efficiently performed on tensors, especially with hardware accelerators like GPUs. Libraries such as TensorFlow and PyTorch provide tensor operations that are optimized for speed.
4. Variable-length Sequences: Some neural network architectures, like RNNs (Recurrent Neural Networks), process variable-length sequences. Tensors provide a convenient way to pad or mask these sequences to fit them into a uniform shape for batch processing.
5. Gradients: During the training process, neural networks adjust their weights using gradient-based optimization algorithms like stochastic gradient descent (SGD). These gradients are tensors with the same shape as the weights they correspond to.
6. Automatic Differentiation: Modern deep learning libraries use tensors in conjunction with computation graphs to perform automatic differentiation. This is crucial for backpropagation, where gradients of the loss function concerning model parameters are computed.
7. Hardware Acceleration: GPUs and TPUs are designed to handle tensor operations efficiently. Representing data, weights, and operations as tensors enables parallel processing capabilities of these hardware accelerators, leading to faster training and inference times.

Tensors are foundational to the design and operation of neural networks, providing a unified way to represent data, perform computations, and leverage modern hardware accelerations. While we have seen a variety of methods that appear to address security of neural networks from an outside-in approach, doing things such as monitoring operational outputs, to truly protect the architectural integrity of neural net models, we need to take an inside-out approach. Certifying and validating the internal state of the network models.

Assuming one can identify and access the necessary data structures within trained network models, what approach should be taken to validate and prove those data? One approach might be to use conventional public-key encryption to isolate, characterize and digitally sign the necessary data so that it can be later validated using the relevant public keys. Such centralized models are highly vulnerable to malicious discovery of the public keys, and the performance burden of such systems make them particularly unsuited for the current generation of large distributed neural network applications, such as Chat GPT. A much more suitable technology to use for this purpose is transient-key cryptography.

Transient-Key Cryptography

In conventional public-key-based data certification cryptosystems, the signature created as a result of data being signed by a private key provides evidence that the signature came from the indicated source. Keypairs persist for years at a time, so the private component must be carefully guarded against disclosure. In a public-key system, anyone with access to a private key can counterfeit that person's digital signature.

In Transient-key Cryptography systems, however, the keypair is assigned to a brief interval of time, not to a particular person or entity. Data signed by a specific private key becomes associated with a specific time and date. A keypair is active only for a brief period of time, after which the private key is permanently destroyed. Therefore, unlike public-key systems, transient-key systems do not depend upon the long-term security of the private keys.

The method was introduced in 1997 and involves chaining blocks of cryptographic data over time. Transient-key cryptography (described in https://en.wikipea.org/wiki/Transient-key cryptography, and incorporated herein by reference) is the predecessor to Forward Security, and was the first example of a decentralized blockchain system. The system was adopted in the mid-2000s as part of the X9.95 ANSI National Standard for Trusted Timestamping.

Comparison: Public-Key Vs. Transient-Key Cryptography:

Public-key Cryptography: The keys are linked to entities such as individuals or organizations. The private key's security is essential as anyone with access can counterfeit the linked digital signature. These keys can persist for years.

Transient-key Cryptography: Keys are tied to specific time intervals. Data signed using a private key can be pinpointed to that specific time frame. Each key is short-lived and is destroyed after its active time interval has passed. One of its main advantages is that it is immune to weaknesses in the long-term security of private keys.

Some Key Components:

1. Time Source: Transient-key systems utilize a consistent time standard for all involved parties. Instead of relying on local systems which can be tampered with, these systems use highly accurate publicly-available clocks to derive time values.
2. Key-chaining: When a time interval ends, a new public/private key pair is generated. The old private key signs the new public key and is then disposed of. If for any reason, there's an issue with the trusted time source, a new chain is initiated. All chains, old and new, are connected via network archives, maintaining data verification through time.
3. Signatures: All signature requests in an interval are logged in a register, which becomes part of the public key for the next period. This method prevents post-hoc addition of "signed events" into the chain.

Cross-Verification:

Transient-key systems are cross-certified using independent servers. This process validates the time interval chain, providing evidence of consensus on the current time. Cross-certification ensures robustness in the system, contrasting traditional public-key systems that are vulnerable if a single private key gets compromised.

Network Archives:

Details of intervals and cross-certifications are stored in a network archive. This archive, vital to the transient-key network, can be stored and duplicated on various systems. The digital signature of every piece of data contains a map to these archives. This map is updated whenever cross-certifications are completed at an interval's start.

Verification:

During an interval, data is signed using the transient private key combined with trusted timestamps. For later verification, the appropriate interval's public key is retrieved. If the signature decrypts using the correct public key, it confirms the signature originated in that time frame. Matching the decrypted and fresh hashes confirms the data remains unchanged since its timestamping and signature.

Transient-key cryptography offers a unique approach to digital security that is particularly suited for use in securing neural networks, by linking cryptographic processes to specific time intervals, and by providing a widely and easily accessible mechanism for data validation.

BRIEF DESCRIPTION OF THE DRAWINGS

FIG. 1 is a block diagram of a system for assuring the architectural integrity of neural network models in accordance with the present disclosure.

BRIEF SUMMARY OF THE INVENTION

The present invention provides a novel computer system and method for ensuring the architectural integrity of neural network models. It certifies and validates the internal state of tensor data structures within neural networks using a combination of cryptographic techniques and timestamping. This approach ensures that any unauthorized changes to the neural network's internal state can be detected and verified, thereby enhancing the security and trustworthiness of the model.

This system can employ transient-key cryptography, a cryptographic technique that links key pairs to specific time intervals rather than individuals or entities, though the present invention can operate with any robust trusted time-stamping system. The transient-key method allows for the generation of time-specific cryptographic key pairs, which are used to sign the hash values of the neural network's state. By associating the neural network's state with a specific time frame, the present invention creates a verifiable record of the model's integrity.

The signed hash values are submitted to a trusted time-stamping authority (TSA), which issues timestamp tokens (TSTs) that include the hash value and a timestamp. These tokens provide a verifiable record of the neural network's state at a given time, ensuring that any changes to the model can be detected and verified.

The present invention also includes mechanisms for storing and archiving the timestamp tokens and associated hash values in a distributed and redundant manner, and for validating them at a later time. This network archive serves as a reference for future verification processes, ensuring that the integrity of the neural network can be validated at any point.

DETAILED DESCRIPTION OF THE INVENTION

The present invention is a new computer system for assuring the architectural integrity of neural network models by certifying and validating the authentic state of the tensor data structures within the neural network models' data environments.

An overview of the system of the present invention follows:

FIG. 1 depicts a first embodiment. In this first embodiment, the internal state 132 of a neural network is expressed as a named list of tensors.

For example:

$$\text{layer-1-weights} = \begin{bmatrix} [1.1 & 1.2 & 1.3] \\ [1.4 & 1.5 & 1.6] \\ [1.7 & 1.8 & 1.9] \end{bmatrix}, \text{layer-1-bias} = \begin{bmatrix} [1 & 2 & 3] \\ [4 & 5 & 6] \\ [7 & 8 & 9] \end{bmatrix}$$

$$\text{layer-2-weights} = \begin{bmatrix} [2.1 & 2.2 & 2.3] \\ [2.4 & 2.5 & 2.6] \\ [2.7 & 2.8 & 2.9] \end{bmatrix}, \text{layer-2-bias} = \begin{bmatrix} [1 & 2 & 3] \\ [4 & 5 & 6] \\ [7 & 8 & 9] \end{bmatrix}$$

Each tensor is a multi-dimensional array with elements in the type of integer, real number, or complex number.

A tensor of dimension=0 is just a single element. e.g., 1

A tensor of dimension=1 can be decomposed into a list of elements, e.g. [1, 2, 3] →1, 2, 3

A tensor of dimension >1 can be decomposed along its outermost dimension into a list of subtensors. e.g.

$$\begin{bmatrix} [1 & 2 & 3] \\ [4 & 5 & 6] \\ [7 & 8 & 9] \end{bmatrix} \Rightarrow [1\ 2\ 3], [4\ 5\ 6], [7\ 8\ 9]$$

Each tensor can also be expressed in a sparse form as follows:

a 2-D regular tensor named "indices"

a 1-D regular tensor named "values"

and a 1-D regular tensor named "shape"

For example, $$\begin{bmatrix} [1 & 0 & 0] \\ [0 & 2 & 0] \\ [0 & 0 & 3] \end{bmatrix} \Rightarrow \text{indices} = \begin{bmatrix} [0 & 0] \\ [1 & 1] \\ [2 & 2] \end{bmatrix}, \text{values} = [1\ 2\ 3], \text{shape} = [3\ 3]$$

The system of the first embodiment 100 is configured to compute the hash of each tensor 112:

1. Select a suitable hashing function H 116 such as SHA-512 (Described in Secure Hash Algorithms SHA https://datatracker.jeff.org/doc/html/rfc6234 and incorporated herein by reference).
2. Compute the dimension of the tensor 118.
3. If dimension=0 120, the tensor has only 1 element. Use ASN.1 DER (Described in Abstract Syntax Notation One ASN.1 Distinguished Encoding Rule DER https://www.itu.int/rec/T-REC-X.690/and incorporated herein by reference) encoding of this element as input into H and return the output 122.
4. If dimension=1 120, decompose the tensor into a list of elements. Use concatenation of the ANS.1 DER (Described in Abstract Syntax Notation One ASN.1 Distinguished Encoding Rule DER https://www.itu.int/rec/T-REC-X.690/and incorporated herein by reference) encoding of each element as input into H and return the output 124.
5. If dimension >1 120, decompose the tensor into a list of subtensors along the outermost dimension. Use concatenation of the hashes of the subtensors as input into H and return the output 126.

$$H\left(\begin{bmatrix}[1 & 2 & 3]\\ [4 & 5 & 6]\\ [7 & 8 & 9]\end{bmatrix}\right) \Rightarrow H\begin{pmatrix}H([1 \ 2 \ 3])\\ +\\ H([4 \ 5 \ 6])\\ +\\ H([7 \ 8 \ 9])\end{pmatrix} \Rightarrow H\begin{pmatrix}H(H(1)+H(2)+H(3))\\ +\\ H(H(4)+H(5)+H(6))\\ +\\ H(H(7)+H(8)+H(9))\end{pmatrix}$$

A pseudo code illustration of this is:

```
def hash_tensor(tensor):
  h=new Hash( )
  switch tensor.dimension:
    case 0: encoded=asn1DerEncode(tensor)
      h.update(encoded)
    case 1: for element in tensor:
        encoded=asn1DerEncode(element)
        h.update(encoded)
    default: for sub_tensor in tensor:
        sub_hash=hash_tensor(sub_tensor)
        h.update(sub_hash)
  return h.finalize( )
```

The system of the first embodiment 100 is further configured to compute the hash of each tensor in sparse form 114:

1. Compute the hashes of indices, values and shape as a regular tensor.
2. Use the concatenation of the indices hash, values hash and shape hash as input into H and return the output 128.

A pseudo code illustration of this is:

```
def hash_sparse_tensor(sparse_tensor):
  h=new Hash( )
  h.update(hash_tensor(sparse_tensor.indices))
  h.update(hash_tensor(sparse_tensor.values))
  h.update(hash_tensor(sparse_tensor.shape))
  return h.finalize( )
```

The system of the first embodiment 100 is further configured to compute the hash of a neural network's state 132, using the following steps:

1. For each named tensor element of the state, construct name_hash 134 by concatenating the name and hash value of the tensor.
2. Concatenate all name_hash values of the state in order as input into H and return the output 136.
3. An alternative approach would be to construct a Merkle tree using name_hash as leaf and return the Merkle root 138.

A pseudo code illustration of this is:

```
def hash_state(state):
  h=new Hash( )
  for name, tensor in state.get_tensor_list( ):
    name_hash = concatenate(name,hash_tensor(tensor))
    h.update(name_hash)
  return h.finalize( )
```

The system of the first embodiment 100 is further configured to timestamp a neural network's state 132:

1. Compute the hash value of the neural network's state.
2. Submit the hash value to a standard-based quantum-safe transient-key Time Stamping Authority (TSA) 240, or another timestamping system such as defined in RFC3161 (Described in RFC3161 Internet X.509 Public Key Infrastructure Time-Stamp Protocol https://www.ietf.org/rfc/rfc3161.txt and incorporated herein by reference) or X9.95 (Described in ANSI X9.95 Time Stamp Management And Security https://webstore.ansi.org/standards/ascx9/ansix9952022 and incorporated herein by reference).
3. TSA 240 issues a Time Stamp Token (TST) 242 in response.
4. Accept and store the TST for safe keeping 244.

The system of the first embodiment 100 is further configured to verify the state of the neural network:

1. Validate the corresponding TST 246. Reject the TST if failed.
2. If TST 242 is valid, then re-compute the hash value of the neural network's state 248.
3. Compare the resulting hash value against the hash value contained inside TST 250. If matches, then the state is the same as the time of TST issuing 252. Otherwise, the state has been altered since the time of TST issuing 254.

Furthermore, for systems that allow graph serialization, the structure of a neural network model can be captured in a computational graph 152. A timestamp token 158 can therefore be issued on the hash 156 of this graph in serialized form 154. A further timestamp can be issued on the hashing of concatenation 164 between a model's graph timestamp 158 and state timestamp 162.

For example:

Graph timestamp=issue_timestamp (hash (graph))

Model timestamp=issue_timestamp (hash (graph timestamp+state timestamp))

The present invention hereby provides a robust system for certifying and validation of the architectural and data integrity of any neural network model.

While the horizon of threats against neural networks is broadening, a confluence of academic research and industry-led initiatives offers hope. As strategies have evolved from adversarial training to model watermarking and then to the present invention, the journey towards robust and secure neural networks is well underway, with each step forging a more resilient future for artificial intelligence.

In the burgeoning world of neural network-driven applications, ensuring the security and authenticity of models has risen as a paramount concern. The advent of embodiments of the present invention heralds a transformative era in this domain, addressing the profound need to safeguard the architectural integrity of neural networks. By assuring that a model's internal structure remains uncompromised, this invention not only elevates the trustworthiness of AI solutions but also bolsters the confidence of industries and end-users alike in adopting these advanced technologies.

This invention's significance is further accentuated in an environment rife with threats ranging from adversarial attacks to model poisoning. Its capability to provide a verifiable assurance against tampering is a game-changer, especially when the stakes involve critical applications in healthcare, finance, and autonomous systems. As businesses and institutions increasingly lean on AI to drive decision-making, innovations, and user experiences, the role of solutions enabled by this invention becomes indispensable, bridging the gap between technological advancement and security assurance.

In sum, as neural networks continue to permeate every facet of our digital landscape, the importance of preserving their integrity cannot be overstated. The present invention stands as a beacon in this endeavor, symbolizing a future where the immense potential of neural networks can be harnessed without compromising on security. Its introduction marks a pivotal step forward, ensuring that the next wave of AI innovations remains robust, reliable, and resilient against malicious threats.

In the foregoing specification, the invention has been described with reference to a specific exemplary embodiment thereof. It will, however, be evident that various modifications and changes may be made thereunto without departing from the broader spirit and scope of the invention as set forth in the appended claims. For example, various programming languages and techniques can be used to implement the disclosed invention. Also, the specific logic presented to accomplish tasks within the present invention may be modified without departing from the scope of the invention. Many such changes or modifications will be readily apparent to one of ordinary skill in the art. The specification is, accordingly, to be regarded in an illustrative rather than a restrictive sense, the invention being limited only by the provided claims.

The invention claimed is:

1. A computing system for generating a timestamped integrity record for a neural network model, the computing system comprising: one or more processors; a memory storing instructions; and a network interface, wherein the instructions, when executed by the one or more processors, cause the computing system to:

(a) obtain an internal state of the neural network model as an ordered list of pairs (tensor name, tensor), the tensors storing parameters of the neural network model comprising weights and biases;

(b) compute, using a cryptographic hash function H, a tensor hash value for each tensor in the ordered list, wherein computing the tensor hash value comprises: (i) when the tensor comprises a sparse tensor data structure comprising an indices tensor, a values tensor, and a shape tensor, inputting into H a concatenation of (A) a hash of the indices tensor, (B) a hash of the values tensor, and (C) a hash of the shape tensor; and (ii) otherwise, determining a dimension of the tensor and: (A) when the dimension equals zero, inputting into H an ASN.1 Distinguished Encoding Rules (DER) encoding of a single tensor element; (B) when the dimension equals one, inputting into H a concatenation of ASN.1 DER encodings of tensor elements; and (C) when the dimension is greater than one, decomposing the tensor along an outermost dimension into subtensors, computing a subtensor hash value for each subtensor, and inputting into H a concatenation of the subtensor hash values;

(c) compute, using the cryptographic hash function H, a state hash value of the internal state by, for each pair (tensor name, tensor) in the ordered list, forming a name_hash value by concatenating the tensor name with the tensor hash value and inputting into H an ordered concatenation of the name_hash values;

(d) transmit, via the network interface, a timestamp request comprising the state hash value to a time-stamping authority that uses transient-key cryptography in which a time-specific public key is associated with a time interval;

(e) receive, from the time-stamping authority, a timestamp token comprising: (i) the state hash value, (ii) a time indication within the time interval, and (iii) a digital signature verifiable using the time-specific public key; and (f) store the timestamp token in association with the state hash value in a distributed network archive comprising a plurality of storage nodes.

2. The computing system of claim 1, wherein computing the state hash value comprises constructing a Merkle tree that uses the name_hash values as leaf values and using a Merkle root of the Merkle tree as the state hash value.

3. The computing system of claim 1, wherein the time-stamping authority generates a different time-specific public/private key pair for each time interval and generates the digital signature in the timestamp token using a transient private key of the time-specific public/private key pair.

4. The computing system of claim 3, wherein the time-stamping authority permanently destroys the transient private key after expiration of the time interval.

5. The computing system of claim 1, wherein the timestamp request and the timestamp token comply with a standardized time-stamping protocol comprising RFC 3161 and wherein the distributed network archive stores redundant copies of the timestamp token on at least two storage nodes.

6. A computer-implemented method for verifying integrity of a neural network model, the method comprising:

(a) retrieving, from a distributed network archive, a timestamp token comprising (i) a baseline state hash value of an internal state of the neural network model, (ii) a time indication, and (iii) a digital signature verifiable using a time-specific public key associated with a time interval that includes the time indication;

(b) validating the timestamp token by verifying the digital signature using the time-specific public key;

(c) obtaining a current internal state of the neural network model as an ordered list of pairs (tensor name, tensor);

(d) computing a current state hash value for the current internal state by: computing a tensor hash value for each tensor using a cryptographic hash function H based on a dimension of the tensor, forming a name_hash value for each tensor by concatenating the tensor name with the tensor hash value, and hashing an ordered concatenation of the name_hash values using H;

(e) comparing the current state hash value to the baseline state hash value; and (f) outputting a verification result indicating whether the current internal state matches the internal state represented by the baseline state hash value.

7. The method of claim 6, wherein outputting the verification result comprises, when the current state hash value differs from the baseline state hash value, outputting an indication of tampering or unauthorized modification of at least one tensor since the time indication.

* * * * *